United States Patent
Shibata et al.

(10) Patent No.: US 7,009,013 B2
(45) Date of Patent: Mar. 7, 2006

(54) PROCESS FOR PRODUCING CRYSTALLINE 1,2-POLYBUTADIENE

(75) Inventors: Masahiro Shibata, Mie (JP); Hisao Ono, Mie (JP)

(73) Assignee: JSR Corporation, Tokyo (JP)

( * ) Notice: Subject to any disclaimer, the term of this patent is extended or adjusted under 35 U.S.C. 154(b) by 8 days.

(21) Appl. No.: 10/521,781

(22) PCT Filed: Jul. 18, 2003

(86) PCT No.: PCT/JP03/09181

§ 371 (c)(1),
(2), (4) Date: Jan. 21, 2005

(87) PCT Pub. No.: WO2004/009652

PCT Pub. Date: Jan. 29, 2004

(65) Prior Publication Data

US 2005/0239982 A1  Oct. 27, 2005

(30) Foreign Application Priority Data

Jul. 22, 2002 (JP) ............................. 2002-211877
Apr. 2, 2003 (JP) ............................. 2003-098737
Jun. 12, 2003 (JP) ............................. 2003-167771

(51) Int. Cl.
*C08F 4/80* (2006.01)
(52) U.S. Cl. ...................... 526/139; 526/171
(58) Field of Classification Search ................ 526/139, 526/171
See application file for complete search history.

(56) References Cited

U.S. PATENT DOCUMENTS

| 3,182,051 A | * | 5/1965 | Marullo et al. ............. 526/153 |
| 4,954,125 A | * | 9/1990 | Ono et al. .................. 526/138 |
| 5,548,045 A | * | 8/1996 | Goto et al. ................. 526/161 |
| 5,879,805 A | | 3/1999 | Brady et al. |

FOREIGN PATENT DOCUMENTS

| JP | 06-298867 | 10/1994 |
| JP | 07-002927 | 1/1995 |
| JP | 08-059733 | 3/1996 |
| JP | 10-158333 | 6/1998 |

OTHER PUBLICATIONS

U.S. Appl. No. 10/521,781, filed Jan. 21, 2005, Shibata et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

1,3-Butadiene is polymerized in a hydrocarbon solvent using a catalyst system containing (A) a cobalt salt, (B1) a phosphine compound having one branched aliphatic group of 3 or more carbon atoms or one alicyclic group of 5 or more carbon atoms and two aromatic groups, and (C) an organic aluminum compound, or a catalyst system containing (A) a cobalt salt, (B) (B1) a phosphine compound having one branched aliphatic group of 3 or more carbon atoms or one alicyclic group of 5 or more carbon atoms and two aromatic groups and/or (B2) a triarylphosphine compound having three aromatic groups, (C) an organic aluminum compound and (D) an active halogen-containing compound, thereby obtaining crystalline 1,2-polybutadiene.

9 Claims, 1 Drawing Sheet

US 7,009,013 B2

PROCESS FOR PRODUCING CRYSTALLINE 1,2-POLYBUTADIENE

TECHNICAL FIELD

The present invention relates to a process for producing crystalline 1,2-polybutadiene, and more particularly to a process for producing 1,2-polybutadiene having a high crystallinity using a specific catalyst system, wherein the vinyl bond content of a polymer obtained is high, and the molecular weight thereof is adjustable.

BACKGROUND ART 1,2-Polybutadiene having crystallinity has hitherto been obtained by a catalyst comprising a phosphine complex of a cobalt salt, a trialkylaluminum and water (patent document 1: JP-B-44-32425, patent document 2: JP-A-1-249788), a catalyst comprising a phosphine complex of a cobalt salt and methylaluminoxane (patent document 3: JP-A-8-59733), or a catalyst comprising a cobalt salt slurry, a phosphine solution and methylaluminoxane [non-patent document 1: Dilip C. D. Nath, Takeshi Shiono and Tomiki Ikeda, *Journal of Polymer Science*, Vol. 40, 3086–3092 (2002)].

In the catalyst systems described these, it can be known by analogy that a phosphine compound having three aromatic groups is substantially necessary in the production of a 1,2-polybutadiene-based polymer having a crystallinity of 34% or more. However, when those phosphine compounds are used, it is required to lower the polymerization temperature, which causes an increase in the amount of a solvent used for preventing precipitation, and in the production of the 1,2-polybutadiene-based polymer obtained by an exothermic reaction, the problem of increasing energy loss such as the necessity for higher cooling capacity to a polymerization reactor.

In the above-mentioned patent document 1 (JP-B4432425), there is described an example to use diphenylethylphosphine as a phosphine compound having one aliphatic group and two aromatic groups. However, it is described that an amorphous (that is to say, having a crystallinity of 0%) polymer is obtained when the phosphine compound is used. It is difficult to know the production of a 1,2-polybutadiene-based polymer having a crystallinity of 34% or more by analogy with the category of phosphines as specifically exemplified in the gazette concerned, that is to say, the phosphine compound having one aliphatic group and two aromatic groups.

Further, in the catalyst systems described in these, when the phosphine complex of the cobalt salt is used, equipment for preparing a catalyst component becomes large to necessitate excessive investment, because of low solubility of the phosphine complex in an organic solvent. Furthermore, when a cobalt chloride slurry is used, the efficiency of catalyst is low. It is therefore necessary to use a large amount of catalyst in order to obtain a polymer, which causes the problems of the coloration of the polymer due to residual catalyst and the like.

The present invention relates to a process for producing 1,2-polybutadiene having a high crystallinity using a specific catalyst system, wherein the vinyl bond content of a polymer obtained is high, and the molecular weight thereof is adjustable.

DISCLOSURE OF THE INVENTION

The present invention relates to a process for producing crystalline 1,2-polybutadiene, which is characterized in that 1,3-butadiene is polymerized in a hydrocarbon solvent using a catalyst system comprising (A) a cobalt salt, (B1) a phosphine compound having one branched aliphatic group of 3 or more carbon atoms or one alicyclic group of 5 or more carbon atoms and two aromatic groups, and (C) an organic aluminum compound (hereinafter also referred to as "production process 1").

Figure 1:
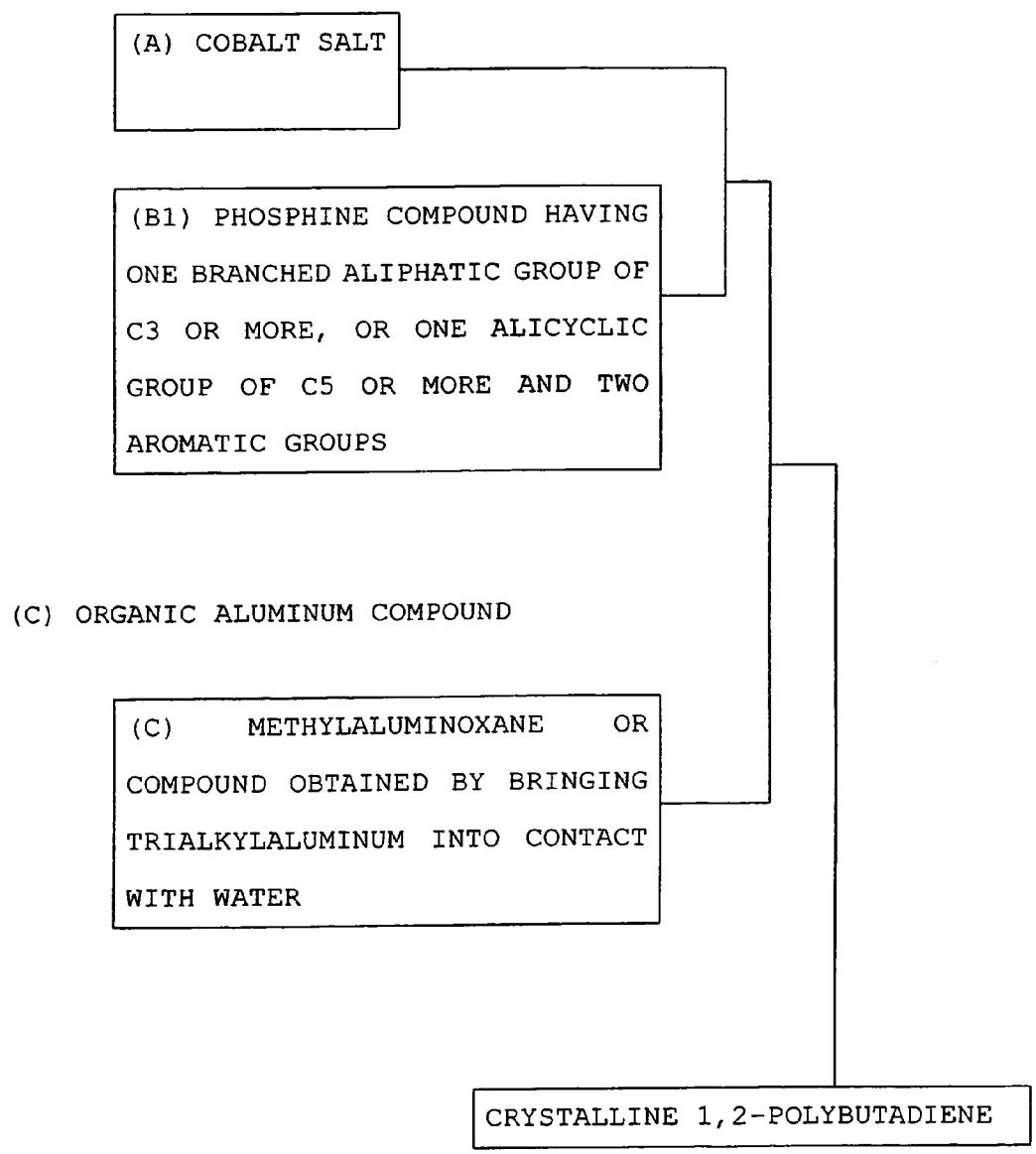
FIG. 1 is a flow chart showing a preferred production process for obtaining crystalline 1,2-polybutadiene of the present invention.

BEST MODE FOR CARRYING OUT THE INVENTION (A) The cobalt salt used in the catalyst of the present invention is a cobalt salt of an organic acid such as cobalt chloride, cobalt bromide, cobalt iodide, cobalt octylate, cobalt versatate or cobalt naphthenate, or the like, and a cobalt salt of an organic acid such as cobalt octylate, cobalt versatate or cobalt naphthenate is preferred in that no halogen atom is contained. Further, of these, cobalt octylate, cobalt versatate or cobalt naphthenate is preferred from the point of high solubility in an organic solvent.

Further, as (B1) the above-mentioned phosphine compound having one branched aliphatic group of 3 or more carbon atoms or one alicyclic group of 5 or more carbon atoms and two aromatic groups, there is preferably used, for example, a phosphine compound having one branched aliphatic group of 3 or more carbon atoms or one alicyclic group of 5 or more carbon atoms and two aromatic groups such as phenyl groups, such as diphenylcyclohexylphosphine shown in formula (1), diphenylisopropylphosphine shown in formula (2), diphenylisobutylphosphine shown in formula (3), diphenyl-t-butylphosphine shown in formula (4), diphenylcyclopentylphosphine shown in formula (5), diphenyl(4-methylcyclohexyl)phosphine shown in formula (6), diphenylcycloheptylphosphine shown in formula (7) or diphenylcyclooctylphosphine shown in formula (8).

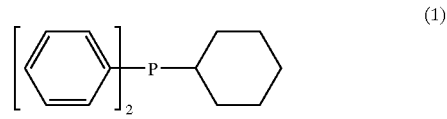

(1)

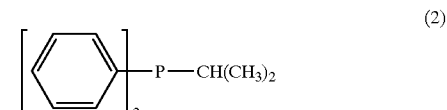

(2)

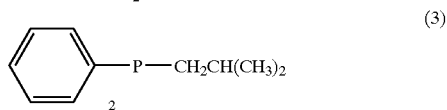

(3)

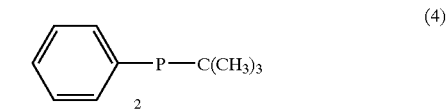

(4)

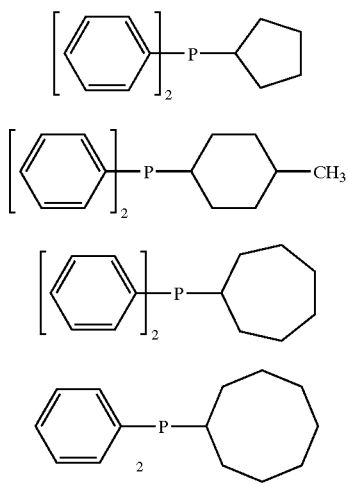

When this catalyst system comprising (A) the cobalt salt, (B1) the phosphine compound having one branched aliphatic group of 3 or more carbon atoms or one alicyclic group of 5 or more carbon atoms and two aromatic groups and (C) the organic aluminum compound is used, a mixed system of (A) to (C) may be used. However, it is preferred that component (C) is used in combination with a phosphine complex of a cobalt salt comprising component (A) and component (B1). When the phosphine complex of the cobalt salt comprising component (A) and component (B1) is used, there may be used either one previously synthesized, or a method of bringing (A) the cobalt salt into contact with (B1) the phosphine compound having one branched aliphatic group of 3 or more carbon atoms or one alicyclic group of 5 or more carbon atoms and two aromatic groups, in a polymerization system.

Specific examples of the phosphine complexes of the cobalt salts comprising (A) the cobalt salt and (B1) the phosphine compound having one branched aliphatic group of 3 or more carbon atoms or one alicyclic group of 5 or more carbon atoms and two aromatic groups include cobaltbis(diphenylcyclohexylphosphine) dichloride, cobaltbis(diphenylcyclohexylphosphine) dibromide, cobaltbis(diphenylisopropylphosphine) dichloride, cobaltbis(diphenylisopropylphosphine) dibromide, cobaltbis(diphenylisobutylphosphine) dichloride, cobaltbis(diphenylisobutylphosphine) dibromide, cobaltbis(diphenyl-t-butylphosphine) dichloride, cobaltbis(diphenyl-t-butylphosphine) dibromide and the like, and preferred are cobaltbis(diphenylcyclohexylphosphine) dichloride and cobaltbis(diphenylcyclohexylphosphine) dibromide.

Further, (C) the organic aluminum compounds include methylaluminoxane or a compound obtained by bringing a trialkylaluminum into contact with water.

Of these, as methylaluminoxane, there may be used either one previously synthesized or one synthesized in the polymerization system.

Besides, the above-mentioned trialkylaluminum is trimethylaluminum, triethylaluminum, triisobutylaluminum, trioctylaluminum or the like, and water is used in an amount of 0.2 to 1.0, preferably 0.3 to 0.75, by the molar ratio based on the aluminum atom of the trialkylaluminum.

As for a contacting method of the trialkylaluminum and water, water may be brought into contact with an inert organic solvent solution of the trialkylaluminum, in any state of vapor, liquid and solid (ice). Further, water may be brought into contact, as a dissolved state, a dispersed state or an emulsified state in an inert organic solvent, or as a gas state or a mist state where it exists in an inert gas.

In the catalyst used in production process 1 of the present invention, the use ratio of (A) the cobalt salt and (B1) the phosphine compound is preferably 1 to 5 mol of (B1) the phosphine compound per mol of (A) the cobalt salt.

Further, the amount of the phosphine complex of the cobalt salt comprising components (A) and (B1) used is within the range of 5,000 to 150,000, preferably 10,000 to 100,000, by the molar ratio of 1,3-butadiene and the cobalt atom in the phosphine complex (1,3-butadiene/Co). When 1,3-butadiene/Co (molar ratio) is less than 5,000, the mechanical strength of a polymer obtained is inferior. On the other hand, exceeding 150,000 results in decreased polymerization activity.

Furthermore, the amount of component (C) (organic aluminum compound) used is within the range of 500 to 4,000, preferably 800 to 2,000, by the molar ratio of 1,3-butadiene and the aluminum atom in component (C) (1,3-butadiene/Al). When 1,3-butadiene/Al (molar ratio) is less than 500, it is economically disadvantageous. On the other hand, exceeding 4,000 results in decreased polymerization activity. The ratio of the aluminum atom of component (C) to the cobalt atom of the phosphine complex of the cobalt salt comprising components (A) and (B1) (Al/Co) is usually from 5 to 300, and preferably about 7.5 to 100. When Al/Co (atomic ratio) is less than 5, polymerization activity is decreased. On the other hand, exceeding 300 results in economical disadvantage.

The catalyst used in production process 1 of the present invention is prepared by mixing catalyst components in an inert organic solvent in any order. Preferably, as shown in FIG. 1, (A) the cobalt salt is allowed to react with (B1) the phosphine compound in an inert organic solvent to form the phosphine complex of the cobalt salt, then, component (C) is added thereto to prepare the catalyst of the present invention, and 1,3-butadiene is polymerized in a hydrocarbon solvent using this catalyst, thereby obtaining crystalline 1,2-polybutadiene.

Further, the amount of (A) the cobalt salt used is within the range of 5,000 to 200,000, preferably 10,000 to 150,000, by the molar ratio of the 1,3-diene and the cobalt atom (1,3-diene/Co). When 1,3-diene/Co (molar ratio) is less than 5,000, the mechanical strength of a polymer obtained is inferior. On the other hand, exceeding 200,000 results in decreased polymerization activity.

Furthermore, the amount of component (C) (aluminoxane) used is within the range of 500 to 4,000, preferably 1,000 to 3,000, by the molar ratio of the 1,3-diene and the aluminum atom in component (C) (1,3-diene/Al). When 1,3-diene/Al (molar ratio) is less than 500, it is economically disadvantageous. On the other hand, exceeding 4,000 results in decreased polymerization activity. The ratio of the aluminum atom of component (C) to the cobalt atom of component (A) (Al/Co) is usually from 5 to 300, and preferably from about 7.5 to 100. When Al/Co (atomic ratio) is less than 5, polymerization activity is decreased. On the other hand, exceeding 300 results in economical disadvantage.

As the inert organic solvents used for the preparation of the catalysts in the above-mentioned production processes 1 and 2 of the present invention, there can be used, for example, an aromatic hydrocarbon such as benzene, toluene or xylene, an aliphatic hydrocarbon such as butane, butene, pentane, pentene, hexane, heptane or octane, an alicyclic hydrocarbon such as cyclopentane or cyclohexane, a chlorinated hydrocarbon such as methylene chloride, 1,2-dichloroethane, 1,1,1-trichloroethane, chlorobenzene, o-dichlorobenzene or p-dichlorobenzene, and a mixture thereof.

As the inert organic solvents used for the preparation of the catalysts, there are also preferably used the same solvents as the polymerization catalysts.

Further, the catalyst may be prepared by previously mixing respective components before it is brought into contact with 1,3-butadiene of the present invention, or can also be prepared by mixing respective components in the presence of a conjugated diene in a polymerization reactor.

In the present invention, 1,2-polybutadiene having a crystallinity of 5% to 40% can be produced by polymerizing 1,3-butadiene in the hydrocarbon solvent using the catalyst system mainly comprising components (A), (B1) and (C).

In the present invention, a conjugated diene other than 1,3-butadiene can also be used together in an amount of about 10% by weight or less. The conjugated dienes other than 1,3-butadiene, which are used in the present invention, include a 4-alkyl-substituted-1,3-butadiene, a 2-alkyl-substituted-1,3-butadiene and the like. Of these, the 4-alkyl-substituted-1,3-butadienes include 1,3-pentadiene, 1,3-hexadiene, 1,3-heptadiene, 1,3-octadiene, 1,3-nonadiene, 1,3-decadiene and the like. Further, typical examples of the 2-alkyl-substituted-1,3-butadienes include 2-methyl-1,3-butadiene (isoprene), 2-ethyl-1,3-butadiene, 2-propyl-1,3-butadiene, 2-isopropyl-1,3-butadiene, 2-butyl-1,3-butadiene, 2-isobutyl-1,3-butadiene, 2-amyl-1,3-butadiene, 2-isoamyl-1,3-butadiene, 2-hexyl-1,3-butadiene, 2-cyclohexyl-1,3-butadiene, 2-isohexyl-1,3-butadiene, 2-heptyl-1,3-butadiene, 2-isoheptyl-1,3-butadiene, 2-octyl-1,3-butadiene, 2-iso-octyl1,3-butadiene and the like. Of these conjugated dienes, preferred examples of the conjugated dienes used as a mixture with 1,3-butadiene include isoprene and 1,3-pentadiene.

The hydrocarbon solvents used as the polymerization solvents include, for example, an aromatic hydrocarbon such as benzene, toluene or xylene, an aliphatic hydrocarbon such as butane, butene, pentane, pentene, hexane, heptane or octane, an alicyclic hydrocarbon such as cyclopentane or cyclohexane, a chlorinated hydrocarbon such as methylene chloride, 1,2-dichloroethane, 1,1,1-trichloroethane, chlorobenzene, o-dichlorobenzene or p-dichlorobenzene, and a mixture thereof. Preferred examples thereof include cyclohexane, heptane, toluene, methylene chloride and the like. More preferred is a non-halogen hydrocarbon solvent such as cyclohexane, heptane or toluene, from the standpoint of the non-halogen series.

The polymerization temperature is usually from −20° C. to +120° C., and preferably from +10° C. to +90° C. The polymerization reaction may be conducted by either a batch system or a continuous system. The monomer concentration in the solvent is usually from 5 to 80% by weight, and preferably from 8 to 40% by weight.

Further, in order to produce a polymer, it is necessary that attention is taken to avoid contamination with a compound having inactivating action, such as oxygen, water or carbon dioxide, to the utmost in the polymerization system for preventing inactivation of the catalyst and the polymer of the present invention.

When the polymerization reaction has proceeded to a desired stage, a polymerization terminator such as an alcohol, an antioxidant, an antiaging agent, an ultraviolet ray absorber and the like are added to a reaction mixture, and then, a polymer formed according to an usual method is separated, washed and dried to be able to obtain desired 1,2-polybutadiene.

1,2-Polybutadiene obtained by the production process of the present invention has a vinyl bond content of 85% or more, preferably 90% or more.

Further, the crystallinity of 1,2-polybutadiene obtained by the present invention is preferably from 5 to 40%, and more preferably from 10 to 35%. Less than 5% results in inferior mechanical strength, whereas exceeding 40% results in inferior processability. The crystallinity is adjustable by the polymerization temperature or the like.

Furthermore, the molecular weight of 1,2-polybutadiene obtained by the present invention is usually from 100,000 to 600,000, by the weight average molecular weight in terms of polystyrene. Less than 100,000 results in inferior strength, whereas exceeding 600,000 results in inferior processability. The molecular weight is adjustable by the aluminum atom/cobalt atom ratio.

The halogen atom content in 1,2-polybutadiene of the present invention thus obtained is preferably low from the standpoint of environmental problems, and is 200 ppm or less, more preferably 100 ppm or less and particularly preferably 50 ppm or less. Exceeding 200 ppm results in an increase in the amount of endocrine disrupter corresponding materials generated in burning in some cases.

Here, the halogen atom content of the resulting polymer can be easily adjusted to 200 ppm or less by using a non-halogen cobalt salt in the catalyst system, particularly in component (B1) or component (B), and by using the above-mentioned non-halogen hydrocarbon solvent as the solvent for catalyst preparation or the polymerization solvent.

Crystalline 1,2-polybutadiene obtained by the present invention is blended as a raw resin or raw rubber, either alone or as a mixture with another synthetic resin, synthetic rubber or natural rubber, further, oil extended with a process oil as needed, and then, ordinary compounding agents for vulcanized rubber such as a filler such as carbon black, a vulcanizing agent and a vulcanization accelerator are added to perform vulcanization as a rubber composition, thereby being able to use for applications requiring mechanical characteristics and wear resistance, for example, tires, hoses, belts, sponges, footwear materials, sheets, films, tubes, packaging materials, resin modifiers, photosensitive materials and other various industrial goods.

EXAMPLES

The present invention will be illustrated in greater detail with reference to the following examples, but the invention should not be construed as being limited by the following examples, as long as it does not exceed a gist thereof.

In the examples, parts and percentages are on a weight basis, unless otherwise specified.

Further, various measurements in the examples were made in accordance with the following methods.

The vinyl bond content (1,2-bond content) of 1,2-polybutadiene was determined by an infrared absorption spectrum method (the Morero's method).

The crystallinity of 1,2-polybutadiene was converted from the density measured by an underwater substitution method, taking the density of 1,2-polybutadiene at a crystallinity of 0% as 0.889 g/cm$^3$, and the density of 1,2-polybutadiene at a crystallinity of 100% as 0.963 g/cm$^3$.

The weight average molecular weight (Mw) was measured by gel permeation chromatography (GPC) at 40° C. using tetrahydrofuran as a solvent.

The halogen atom content was determined by a fluorescent X-ray measurement (FP method).

The melt flow index (MI) showed the amount (g) of a resin flowed out for a period of time corresponding to 10 minutes under conditions of a temperature of 150° C. and a load of 2.16 kilograms, with a melt flow indexer.

Example 1

Preparation of Cobaltbis(diphenylcyclohexylphosphine) Dichloride Solution:

In an atmosphere of dry nitrogen, 2.2 g of anhydrous cobalt chloride, 8.0 g of diphenylcyclohexylphosphine and 125 g of methylene chloride were added into a 300-ml pressure bottle, and stirred in a constant temperature water bath of 35° C. for 4 hours, followed by separation of a precipitate to obtain an 8% methylene chloride solution of cobaltbis(diphenylcyclohexylphosphine) dichloride. This solution was diluted with methylene chloride, and used as a 0.4% solution.

Polymerization of 1,3-Butadiene:

In an atmosphere of dry nitrogen, 25 g of 1,3-butadiene (BD) and 125 g of cyclohexane were put into a 300-ml pressure bottle, and the 0.4% solution of cobaltbis (diphenylcyclohexylphosphine) dichloride obtained above and a 1% (as Al atoms) solution of methylaluminoxane in toluene were each added so as to give BD/Co (molar ratio)=30,000 and Al/Co (atomic ratio)=20, respectively, followed by polymerization in a constant temperature water bath of 50° C. for 120 minutes.

Reaction termination was performed by adding a small amount of ethanol as a terminator.

Then, 2,6-di-t-butyl-p-cresol was added in an amount of 0.3 part based on 100 parts of the polymer, and heated on a hot plate to remove the solvents, thereby obtaining the polymer. The degree of polymerization conversion was determined from the yield. Further, the halogen content in the polymer was measured. The results are shown in Table 1.

Examples 2 to 7

Using the same technique as with Example 1, by cobalt salts and phosphine compounds shown in Table 1, solutions of phosphine complexes of the cobalt salts were prepared, and polymerization of 1,3-butadiene was conducted under conditions of BD/Co ratios and Al/Co ratios shown in Table 1. The results are shown in Table 1.

Comparative Examples 1 to 4

Using the same technique as with Example 1, by cobalt salts and phosphine compounds shown in Table 1, solutions of phosphine complexes of the cobalt salts were prepared, and polymerization of 1,3-butadiene was conducted under conditions of BD/Co ratios and Al/Co ratios shown in Table 1. The results are shown in Table 2.

TABLE 1

|  | Example 1 | Example 2 | Example 3 | Example 4 | Example 5 | Example 6 | Example 7 |
|---|---|---|---|---|---|---|---|
| Polymerization Solvent | Cyclohexane | Cyclohexane | Cyclohexane | Cyclohexane | Cyclohexane | Cyclohexane | Cyclohexane |
| Solvent/1,3-Butadiene (Weight Ratio) | 5 | 5 | 5 | 5 | 5 | 5 | 5 |
| Cobalt Salt | Cobalt Chloride | Cobalt Chloride | Cobalt Chloride | Cobalt Bromide | Cobalt Chloride | Cobalt Chloride | Cobalt Chloride |
| Phosphine Compound | Diphenylcyclohexylphosphine | Diphenylcyclohexylphosphine | Diphenylcyclohexylphosphine | Diphenylcyclohexylphosphine | Diphenylisopropylphosphine | Diphenylisobutylphosphine | Diphenyl-t-butylphosphine |
| Polymerization Temperature | 50° C. | 50° C. | 50° C. | 50° C. | 50° C. | 50° C. | 50° C. |
| Polymerization Time | 120 min | 120 min | 120 min | 120 min | 120 min | 120 min | 120 min |
| BD/Co (Molar Ratio) | 30,000 | 45,000 | 60,000 | 90,000 | 45,000 | 60,000 | 60,000 |
| Al/Co (Atomic Ratio) | 20 | 30 | 40 | 60 | 30 | 40 | 40 |
| Degree of Polymerization Conversion | 82% | 80% | 80% | 81% | 81% | 82% | 78% |
| State of Solution | Uniform | Uniform | Uniform | Uniform | Uniform | Uniform | Uniform |
| Vinyl Bond Content | 95% | 95% | 95% | 94% | 94% | 91% | 92% |
| Crystallinity | 37% | 37% | 37% | 36% | 36% | 34% | 34% |
| Weight Average Molecular Weight | 150,000 | 170,000 | 230,000 | 140,000 | 160,000 | 180,000 | 170,000 |
| Halogen Content | 45 ppm | 36 ppm | 27 ppm | 40 ppm | 35 ppm | 28 ppm | 30 ppm |

TABLE 2

|  | Comparative Example 1 | Comparative Example 2 | Comparative Example 3 | Comparative Example 4 |
|---|---|---|---|---|
| Polymerization Solvent | Cyclohexane | Cyclohexane | Cyclohexane | Cyclohexane |
| Solvent/1,3-Butadiene (Weight Ratio) | 5 | 5 | 5 | 5 |
| Cobalt Salt | Cobalt Chloride | Cobalt Chloride | Cobalt Bromide | Cobalt Bromide |
| Phosphine Compound | Tris(3,5-dimethylphenyl)phosphine | Tris(3,5-dimethylphenyl)phosphine | Tris(3,5-dimethylphenyl)phosphine | Tris(3,5-dimethylphenyl)phosphine |

TABLE 2-continued

|  | Comparative Example 1 | Comparative Example 2 | Comparative Example 3 | Comparative Example 4 |
|---|---|---|---|---|
| Polymerization Temperature | 50° C. | 30° C. | 50° C. | 30° C. |
| Polymerization Time | 120 min | 180 min | 120 min | 180 min |
| BD/Co (Molar Ratio) | 60,000 | 60,000 | 90,000 | 90,000 |
| Al/Co (Atomic Ratio) | 40 | 40 | 60 | 60 |
| Degree of Polymerization Conversion | 80% | 78% | 81% | 79% |
| State of Solution | Uniform | Precipitated | Uniform | Precipitated |
| Vinyl Bond Content | 92% | 94% | 92% | 94% |
| Crystallinity | 25% | 35% | 24% | 35% |
| Weight Average Molecular Weight | 190,000 | 220,000 | 210,000 | 250,000 |
| Halogen Content | 28 ppm | 28 ppm | 39 ppm | 42 ppm |

As apparent from Tables 1 and 2, it turns out that the polymers having a high crystallinity can be obtained at a polymerization temperature of 50° C. in Examples 1 to 7, but that the polymerization temperature must be lowered to 30° C. in Comparative Examples 1 to 4, in order to obtain an equivalent crystallinity. Consequently, Examples 1 to 7 require a shorter polymerization time, but Comparative Examples 2 and 4 require a longer polymerization time, which practically causes a problem.

Example 8

Preparation of Phosphine Complex Solution:

Using the same technique as with Example 1, by a cobalt salt and a phosphine compound shown in Table 3, a solution of a phosphine complex of the cobalt salt was prepared.

Polymerization of 1,3-Butadiene:

In an atmosphere of dry nitrogen, 25 g of 1,3-butadiene (BD) and 250 g of methylene chloride were put into a 300-ml pressure bottle, and water in the system was adjusted to water/Al (molar ratio)=0.7. In a state cooled to 10° C., an 8% solution of triisobutylaluminum in methylene chloride was added so as to give BD/Co (molar ratio)=20,000 and Al/Co (atomic ratio)=20, followed by thorough stirring. Then, the resulting solution of the phosphine complex of the cobalt salt was added so as to give BD/Co (molar ratio)=20,000, and thereafter, the bottle was immediately placed in a constant temperature water bath of 20° C., followed by polymerization for 60 minutes.

Reaction termination was performed by adding a small amount of ethanol as a terminator. Then, 2,6-di-t-butyl-p-cresol was added in an amount of 0.3 part based on 100 parts of the polymer, and heated on a hot plate to remove the solvents, thereby obtaining the polymer. The degree of polymerization conversion was determined from the yield. The results are shown in Table 3.

Comparative Examples 5 to 7

Using the same technique as with Example 8, by cobalt salts and phosphine compounds shown in Table 3, solutions of phosphine complexes of the cobalt salts were prepared, and polymerization of 1,3-butadiene was conducted under conditions of BD/Co ratios and Al/Co ratios shown in Table 3. The results are shown in Table 3.

TABLE 3

|  | Example 8 | Comparative Example 5 | Comparative Example 6 | Comparative Example 7 |
|---|---|---|---|---|
| Polymerization Solvent | Methylene Chloride | Methylene Chloride | Methylene Chloride | Methylene Chloride |
| Solvent/1,3-Butadiene (Weight Ratio) | 10 | 10 | 10 | 10 |
| Cobalt Salt | Cobalt Bromide | Cobalt Bromide | Cobalt Bromide | Cobalt Bromide |
| Phosphine Compound | Diphenylcyclohexylphosphine | Tris(3,5-dimethylphenyl)phosphine | Tris(3,5-dimethylphenyl)phosphine | Tris(3,5-dimethylphenyl)phoshine |
| Polymerization Temperature | 20° C. | 20° C. | −5° C. | 20° C. |
| Polymerization Time | 60 min | 60 min | 90 min | 60 min |
| BD/Co (Molar Ratio) | 20,000 | 20,000 | 15,000 | 20,000 |
| Al/Co (Atomic Ratio) | 20 | 20 | 15 | 20 |
| Degree of Polymerization Conversion | 86% | 81% | 83% | 84% |
| State of Solution | Uniform | Uniform | Precipitated | Uniform |
| Vinyl Bond Content | 95% | 92% | 95% | 93% |
| Crystallinity | 38% | 29% | 37% | 30% |
| Weight Average Molecular Weight | 160,000 | 170,000 | 180,000 | 160,000 |
| Halogen Content | 351 ppm | 387 ppm | 524 ppm | 483 ppm |

As apparent from Table 3, it turns out that the polymer having a high crystallinity has been obtained at a polymerization temperature of 20° C. in Example 8, but that the polymers having a low crystallinity have been obtained at a polymerization temperature of 20° C. in Comparative Examples 5 and 7. On the other hand, it turns out that the polymerization temperature must be lowered to −5° C. in Comparative Example 6, in order to obtain an equivalent crystallinity. Consequently, Example 8 requires a shorter polymerization time, but Comparative Example 6 requires a longer polymerization time, which practically causes a problem.

As described above, in a method which can be known by analogy from the descriptions of JP-B-44-32425, JP-A-1-249788 and JP-A-8-59733, that is to say, in a case that a phosphine compound having three aromatic groups is used as the phosphine compound, a lower crystallinity is obtained under equivalent conditions. When it is intended to obtain a polymer having an equivalent crystallinity, the polymerization temperature must be lowered, which causes an increase in the amount of a solvent used for preventing precipitation, and in the production of the 1,2-polybutadiene obtained by an exothermic reaction, the problem of increasing energy loss such as the necessity for higher cooling capacity to a polymerization reactor. It is therefore apparent that the method is industrially disadvantageous.

INDUSTRIAL APPLICABILITY

Crystalline 1,2-polybutadiene obtained by the present invention is blended as a raw resin or raw rubber, either alone or as a mixture with another synthetic resin, synthetic rubber or natural rubber, further, oil extended with a process oil as needed, and then, ordinary compounding agents for vulcanized rubber such as a filler such as carbon black, a vulcanizing agent and a vulcanization accelerator are added to perform vulcanization as a rubber composition, thereby being able to use for applications requiring mechanical characteristics and wear resistance, for example, tires, hoses, belts, sponges, footwear materials, sheets, films, tubes, packaging materials, resin modifiers, photosensitive materials and other various industrial goods.

The invention claimed is:

1. A process for producing crystalline 1,2-polybutadiene, comprising polymerizing 1,3-butadiene in a hydrocarbon solvent with a catalyst system comprising (A) a cobalt salt, (B1) a phosphine compound having one branched aliphatic group of 3 or more carbon atoms or one alicyclic group of 5 or more carbon atoms and two aromatic groups, and (C) an organic aluminum compound.

2. The process for producing crystalline 1,2-polybutadiene according to claim 1, wherein the catalyst system comprises a phosphine complex of a cobalt salt obtained by mixing component (A) and component (B1), and component (C).

3. The process for producing crystalline 1,2-polybutadiene according to claim 1, wherein component (A) is at least one selected from the group consisting of cobalt chloride, cobalt bromide, cobalt octylate, cobalt versatate and cobalt naphthenate.

4. The process for producing crystalline 1,2-polybutadiene according to claim 1, wherein component (B1) is diphenylcyclohexylphosphine.

5. The process for producing crystalline 1,2-polybutadiene according to claim 1, wherein the use ratio of component (B1) to mol of component (A) is from 1 to 5 mol.

6. The process for producing crystalline 1,2-polybutadiene according to claim 1, wherein the amount of component (C) is within the range of 500 to 4,000 by the molar ratio of 1,3-butadiene and the aluminum atom in component (C) (1,3-butadiene/Al).

7. The process for producing crystalline 1,2-polybutadiene according to claim 1, wherein the hydrocarbon solvent is selected from the group consisting of cyclohexane methylene chloride and mixtures thereof.

8. The process for producing crystalline 1,2-polybutadiene according to claim 1, wherein the polymerization temperature is from −20° C. to +120° C.

9. The process for producing crystalline 1,2-polybutadiene according to claim 1, wherein the crystallinity of the resulting 1,2-polybutadiene is from 5 to 40%.

* * * * *